(12) United States Patent
Maehiro et al.

(10) Patent No.: US 7,403,971 B2
(45) Date of Patent: Jul. 22, 2008

(54) INFORMATION PROCESSING SYSTEM, METHOD FOR MESSAGE COMMUNICATIONS, RECORDING MEDIUM, AND COMPUTER PROGRAM

(75) Inventors: Kazutoyo Maehiro, Tokyo (JP); Masayuki Takada, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 719 days.

(21) Appl. No.: 09/821,267

(22) Filed: Mar. 29, 2001

(65) Prior Publication Data

US 2002/0062349 A1 May 23, 2002

(30) Foreign Application Priority Data

Nov. 17, 2000 (JP) ............................. 2000-351913

(51) Int. Cl.
G06F 15/16 (2006.01)
(52) U.S. Cl. ..................... 709/206; 709/203; 709/246; 704/8; 704/9; 704/10
(58) Field of Classification Search ................. 709/206; 707/3
See application file for complete search history.

(56) References Cited

U.S. PATENT DOCUMENTS

| | | | | |
|---|---|---|---|---|
| 5,268,839 A | * | 12/1993 | Kaji | 704/3 |
| 5,592,656 A | * | 1/1997 | Canzone | 719/313 |
| 5,809,476 A | | 9/1998 | Ryan | |
| 5,813,018 A | * | 9/1998 | Kaji et al. | 715/502 |
| 5,819,261 A | * | 10/1998 | Takahashi et al. | 707/3 |
| 5,960,382 A | * | 9/1999 | Steiner | 704/2 |
| 5,987,402 A | * | 11/1999 | Murata et al. | 704/2 |
| 6,016,478 A | | 1/2000 | Zhang et al. | |
| 6,041,293 A | * | 3/2000 | Shibata et al. | 704/4 |
| 6,092,036 A | * | 7/2000 | Hamann | 704/8 |

(Continued)

FOREIGN PATENT DOCUMENTS

EP 0150273 8/1985

(Continued)

OTHER PUBLICATIONS

English language Abstract of JP 11-259568.

(Continued)

Primary Examiner—Bunjob Jaroenchonwanit
Assistant Examiner—Duyen M Doan
(74) Attorney, Agent, or Firm—Greenblum & Bernstein, P.L.C.

(57) ABSTRACT

An information processing apparatus is capable of translating semantic contents of a received message and entering a schedule specified by such a message into a scheduler. A user terminal on the sending side makes a list of words or phrases in a data table and accepts the selection of such words or phrases. The user terminal sends a set of identifiers corresponding to selected words or phrases to a user terminal on the receiving side. The user terminal on the receiving side extracts a set of words or phrases corresponding to the received set of the identifiers from a data table. A display device on the receiving side displays a menu screen for accepting the entry of a schedule including the extracted words or phrases. If the user terminal on the receiving side accepts the entry of the schedule, the message displayed on the screen is entered in the scheduler.

8 Claims, 7 Drawing Sheets

U.S. PATENT DOCUMENTS

| | | | |
|---|---|---|---|
| 6,100,824 A | 8/2000 | MacLeod et al. | |
| 6,201,536 B1 * | 3/2001 | Hendricks et al. | 345/716 |
| 6,212,526 B1 * | 4/2001 | Chaudhuri et al. | 707/102 |
| 6,249,765 B1 * | 6/2001 | Adler et al. | 704/500 |
| 6,321,188 B1 * | 11/2001 | Hayashi et al. | 704/4 |
| 6,532,442 B1 * | 3/2003 | Schumacher et al. | 704/2 |
| 6,546,365 B1 * | 4/2003 | Gajda et al. | 704/8 |
| 6,571,234 B1 * | 5/2003 | Knight et al. | 707/3 |
| 6,609,091 B1 * | 8/2003 | Budzinski | 704/9 |
| 6,615,258 B1 * | 9/2003 | Barry et al. | 709/223 |
| 6,658,151 B2 * | 12/2003 | Lee et al. | 382/229 |
| 6,725,256 B1 * | 4/2004 | Albal et al. | 709/206 |
| 2002/0006826 A1 * | 1/2002 | Hansted | 463/42 |
| 2002/0026306 A1 * | 2/2002 | Bangalore et al. | 704/9 |
| 2002/0193986 A1 * | 12/2002 | Schirris | 704/8 |
| 2003/0063218 A1 * | 4/2003 | Kwoh | 348/468 |
| 2003/0150300 A1 * | 8/2003 | Hu | 81/63.2 |

FOREIGN PATENT DOCUMENTS

| | | |
|---|---|---|
| JP | 10-240818 | 9/1998 |
| JP | 11-136278 | 5/1999 |
| JP | 11-143616 | 5/1999 |
| JP | 11-259568 | 9/1999 |
| JP | 2000-003316 | 1/2000 |
| WO | 99/22330 | 5/1999 |

OTHER PUBLICATIONS

English language Abstract of JP 11-143616.
English language Abstract of JP2000-003316.

* cited by examiner

INVITATION-MESSAGE INPUT WINDOW

| WHEN? | YEAR | MONTH | DAY | HOUR | MINUTE |
|---|---|---|---|---|---|
|  | 2000 | 10 | 10 | 19 | 30 |

WHERE?

| 00 | 僕の家 |
|---|---|
| 01 | 私の家 |
| 02 | オレの家 |
| 03 | 学校 |
| 04 | 遊園地 |
| 05 | 公園 |
| ⋮ | ⋮ |

WHO?

| 00 | 僕と |
|---|---|
| 01 | 私と |
| 02 | 俺と |
| ⋮ | ⋮ |

LET'S WHAT?

| 00 | 話そう |
|---|---|
| 01 | 遊ぼう |
| 02 | お出かけしょう |
| ⋮ | ⋮ |

| THE MESSAGE OF INVITATION ||
|---|---|
| DATE | 10-oct-2000 |
| TIME | 19:30 |
| PLACE | an amusement park |
| SUBJECT | Let's play |
| ATTENDEES | with me |

YES 701  NO 703

FIG.7

INFORMATION PROCESSING SYSTEM, METHOD FOR MESSAGE COMMUNICATIONS, RECORDING MEDIUM, AND COMPUTER PROGRAM

The present disclosure relates to subject matter contained in Japanese Patent Application No. 2000-351913, filed on Nov. 17, 2000, the disclosure of which is expressly incorporated herein by reference in its entirety.

BACKGROUND OF THE INVENTION

1. Field of the Invention

The present invention relates to an information processing apparatus, a method for message communications to be used in such a processing system, and a recording medium and a computer program. Especially the present invention relates to an information processing apparatus and a method for message communications for adding a schedule on a scheduler in accordance with a receiving message, and a recording medium and a computer program to be used in the system and the method.

2. Description of the Related Art

Heretofore, software programs for organizing personal schedules (hereinafter, simply referred to as "schedulers") have been well known in the art with these programs each user manually enters his or her schedule into the scheduler in his or her personal computer (or other information processing apparatus). For example, if the user makes an appointment with his or her friend, appointment information such as the date and the place of the meeting could be sent from the user's computer to the friend's computer by means of e-mail or the like. Then, his or her friend enters such designated time and place into a scheduler running on the computer. In this case, however, such an entering operation may be complicated for the user of each computer. For this reason, technologies for automatically entering any schedule into a scheduler using received e-mails have been developed in the art.

Japanese Patent Application Laid-open No. 11-259568 (1999) discloses the procedure in which a computer analyzes the contents of an e-mail and then such contents of the e-mail is written to a scheduler when the computer determines that the contents should be written to the scheduler. However, the conventional procedure for entering data into the scheduler has the problem that the load on the computer is increased as the contents of e-mail must be analyzed by the computer.

In addition, there is another problem that such an analysis takes much time because of the need for analyzing the semantic contents of words and phrases used in the e-mail.

SUMMARY OF THE INVENTION

Therefore, an object of the preset invention is to provide an information processing apparatus, a method for message communications, a recording medium, and a computer program, for entering a schedule using a scheduler, capable of accelerating the analysis of a message that contains the information of such a schedule.

In a first aspect of the present invention, for attaining the above object, there is provided an information processing apparatus capable of sending a message about a schedule to a 2nd information processing apparatus through a communications network. The 2nd information processing apparatus is capable of analyzing the message being received and extracting words or phrases for entering them in the schedule managed by a scheduler. The apparatus includes a first storage device that stores a group of first data sets in which the words or phrases are matched to respective identifiers, while a second storage device in the second information processing apparatus stores a group of second data sets corresponding to words or phrases having the same semantic contents as those of the words or phrases corresponding to the respective identifiers of the first data sets. The apparatus also includes a word or phrase selecting system that selects at least one also includes word or phrase from the words or phrases stored in the first storage device; and an extracting system that extracts a specific identifier corresponding to the selected word or phrase from the first data sets. The apparatus also includes a transmitter that transmits the extracted identifier as the message to the another information processing apparatus. The identifier transmitted from the information processing apparatus is converted to a specific word or phrase on the basis of the second data sets stored in the second storage device.

Therefore, the present invention is capable of forming a message by selecting several words or phrases for predetermined categories (e.g., "When", "Where", and "Who") and sending identifiers corresponding to the respective words or phrases from the sending side to the receiving side, so that the contents of the message can be entered in the scheduler on the receiving side without analyzing sentences in the message. In addition, the message can be encrypted by the identifiers during message transmission, providing adequate security of message transmission. Furthermore, the amount of data corresponding to the identifiers to be transmitted is less than the amount of data corresponding to a combination of words or phrases that semantically match those identifiers, allowing the advantage of data compression.

In the first aspect of the present invention, the words or phrases stored in the first storage device may be represented by a first language, while the words or phrases stored in the second storage device may be represented by a second language different from the first language. Therefore, only the identifier sets are transmitted from the sending side to the receiving side, so that the message transmission and reception can be attained even if these sides use different languages, respectively.

In the first aspect of the present invention, the words or phrases of the first and the second storage devices are grouped into different categories and then stored in the first and the second storage devices, respectively. Therefore, the entry of the schedule in the information processing apparatus can be performed on the basis of each of the categories (e.g., "When", "Where", and "Who").

In a second aspect of the present invention, an information processing apparatus capable of receiving a message about a schedule from a 2nd information processing apparatus through a communications network is provided. The second apparatus analyzes the message being received, and extracts words or phrases for entering them in the schedule managed by a scheduler. The apparatus includes a first storage device that stores a group of first data sets in which the words or phrases are matched to respective identifiers, while a second storage device in the 2nd information processing apparatus stores a group of second data sets corresponding to words or phrases having the same semantic contents as those of the words or phrases corresponding to the respective identifiers of the first data sets. The apparatus also includes a converter that converts the message in the form of the identifiers transmitted from the 2nd information processing apparatus to the words or phrases on the basis of the first data sets stored in the first storage device; and an entry system that enters the words or phrases converted by the converter in the schedule. Therefore, only the identifier sets are transmitted from the sending side to the receiving side without analyzing the sentence or the like, so that the contents of the message can be entered in the scheduler.

In the second aspect of the present invention, the words or phrases stored in the first storage device may be represented by a first language, while the words or phrases stored in the second storage device may be represented by a second language different from the first language. Therefore, only the identifier sets are transmitted from the sending side to the receiving side, so that the message transmission and reception can be attained even if these sides use different languages, respectively.

In the second aspect of the present invention, the words or phrases of the first and the second storage devices are grouped into different categories and then stored in the first and the second storage devices, respectively. Therefore, the entry of the schedule in the information processing apparatus can be performed on the basis of each of the categories (e.g., "When", "Where", and "Who").

In the second aspect of the present invention, furthermore, the information processing apparatus may also include a returning system by which the message received from the 2nd information processing apparatus is sent back to the 2nd information processing apparatus when the words or phrases are entered in the scheduler by the entry system. Therefore, the identifier set is transmitted from the receiving side in which the schedule is entered to the sending side through a profile server, so that the receiving side, the profile server, and the sending side are able to match their schedules to each other.

In a third aspect of the present invention, there is provided a method for message communications that allows an information processing apparatus to send a message about a schedule to, a 2nd information processing apparatus through a communications network. The 2nd information processing apparatus is capable of analyzing the message being received and extracting words or phrases for entering them in the schedule managed by a scheduler. The method includes storing a group of first data sets in a storage device of the information processing apparatus. The first data set matches the words or phrases to respective identifiers, while the 2nd information processing apparatus stores a group of second data sets corresponding to words or phrases having the same semantic contents as those of the words or phrases corresponding to the respective identifiers of the first data sets. The method also includes; selecting at least one word or phrase from the words or phrases stored in the first storage device; extracting a specific identifier corresponding to the selected word or phrase from the first data sets; and transmitting the extracted identifier as the message to the 2nd information processing apparatus. The identifier transmitted from the information processing apparatus is converted to a specific word or phrase on the basis of the second data.

Therefore, only the identifier sets are transmitted from the sending side to the receiving side without analyzing of the sentence or the like, so that the contents of the message can be entered in the scheduler.

In a fourth aspect of the present invention, there is provided a method for message communications that allows an information processing apparatus to receive a message about a schedule from a 2nd information processing apparatus through a communications network. The 2nd information processing apparatus is capable of analyzing the message being received, and extracting words or phrases for entering them in the schedule managed by a scheduler. The method includes storing a group of first data sets in a storage device of the information processing apparatus. The first data set matches the words or phrases to respective identifiers, while the 2nd information processing apparatus stores a group of second data sets corresponding to words or phrases having the same semantic contents as those of the words or phrases corresponding to the respective identifiers of the first data sets. The method also includes converting the message in the form of the identifiers transmitted from the 2nd information processing apparatus to the words or phrases on the basis of the first data sets stored in the first recording device; and entering the converted words or phrases in the schedule.

Therefore, only the identifier sets are transmitted from the sending side to the receiving side without analyzing the sentence or the like, so that the contents of the message can be entered in the scheduler.

In a fifth aspect of the present invention, there is provided a recording medium on which a program is recorded, wherein the program enables an information processing apparatus to send a message about a schedule to a 2nd information processing apparatus through a communications network. The 2nd information processing apparatus is capable of analyzing the message being received and extracting words or phrases for entering them in the schedule managed by a scheduler. The program stores a group of first data sets in a storage device of the information processing apparatus. The first data set matches the words or phrases to respective identifiers, while the 2nd information processing apparatus stores a group of second data sets corresponding to words or phrases having the same semantic contents as those of the words or phrases corresponding to the respective identifiers of the first data sets. The program also selects at least one word or phrase from the words or phrases stored in the first storage device; extracts a specific identifier corresponding to the selected word or phrase from the first data sets; and transmits the extracted identifier as the message to the 2nd information processing apparatus.

In a sixth aspect of the present invention, there is provided a recording medium on which a program is recorded, wherein the program enables an information processing apparatus to receive a message about a schedule from another information processing apparatus through a communications network. The other information processing apparatus is capable of analyzing the message being received, and extracting words or phrases for entering them in the schedule managed by a scheduler. The program stores a group of first data sets in a storage device of the information processing apparatus. The first data set matches the words or phrases to respective identifiers, while a second information processing apparatus stores a group of second data sets corresponding to words or phrases having the same semantic contents as those of the words or phrases corresponding to the respective identifiers of the first data sets. The program converts the message in the form of the identifiers transmitted from the other information processing apparatus to the words or phrases on the basis of the first data sets stored in the first recording device; and enters the converted words or phrases in the schedule.

Accordingly, the program that provides each word or phrase with the specific identifier to be transmitted to the receiving side is provided and only the identifier sets are transmitted from the sending side to the receiving side without carrying out the analysis of the sentence or the like. Consequently, the contents of the message can be entered in the scheduler. In addition, the message can be encrypted by the identifiers during message transmission, providing adequate security of message transmission.

In a seventh aspect of the present invention, there is provided a computer program for enabling an information processing apparatus to send a message about a schedule to another information processing apparatus through a communications network. The other information processing apparatus is capable of analyzing the message being received and extracting words or phrases for entering them in the schedule managed by a scheduler. The program stores a group of first data sets in a storage device of the information processing apparatus. The first data set matches the words or phrases to respective identifiers, while another information processing apparatus stores a group of second data sets corresponding to words or phrases having the same semantic contents as those of the words or phrases corresponding to the respective identifiers of the first data sets. The program also selects at least one word or phrase from the words or phrases stored in the first storage device; extracts a specific identifier corresponding to the selected word or phrase from the first data sets; and transmits the extracted identifier as the message to the other information processing apparatus.

In an eighth aspect of the present invention, there is provided a computer program for enabling an information processing apparatus to receive a message about a schedule from another information processing apparatus through a communications network. The other information processing apparatus is capable of analyzing the message being received, and extracting words or phrases for entering them in the schedule managed by a scheduler. The program stores a group of first data sets in a storage device of the information processing apparatus. The first data set matches the words or phrases to respective identifiers, while the other information processing apparatus stores a group of second data sets corresponding to words or phrases having the same semantic contents as those of the words or phrases corresponding to the respective identifiers of the first data sets. The program also converts the message in the form of the identifiers transmitted from the other information processing apparatus to the words or phrases on the basis of the first data sets stored in the first recording device; and enters the converted words or phrases in the schedule.

As only the identifiers are transmitted from one side to the other side, the contents of the message can be entered in the scheduler without analyzing sentences or the like, reducing the load on the transmission of message.

The above and other objects, effects, features, and advantages of the present invention will become apparent from the following description of embodiments thereof taken in conjunction with the accompanying drawings.

DESCRIPTION OF THE PREFERRED EMBODIMENTS

Hereinafter, we will describe preferred embodiments of the present invention in detail.

Figure 1:
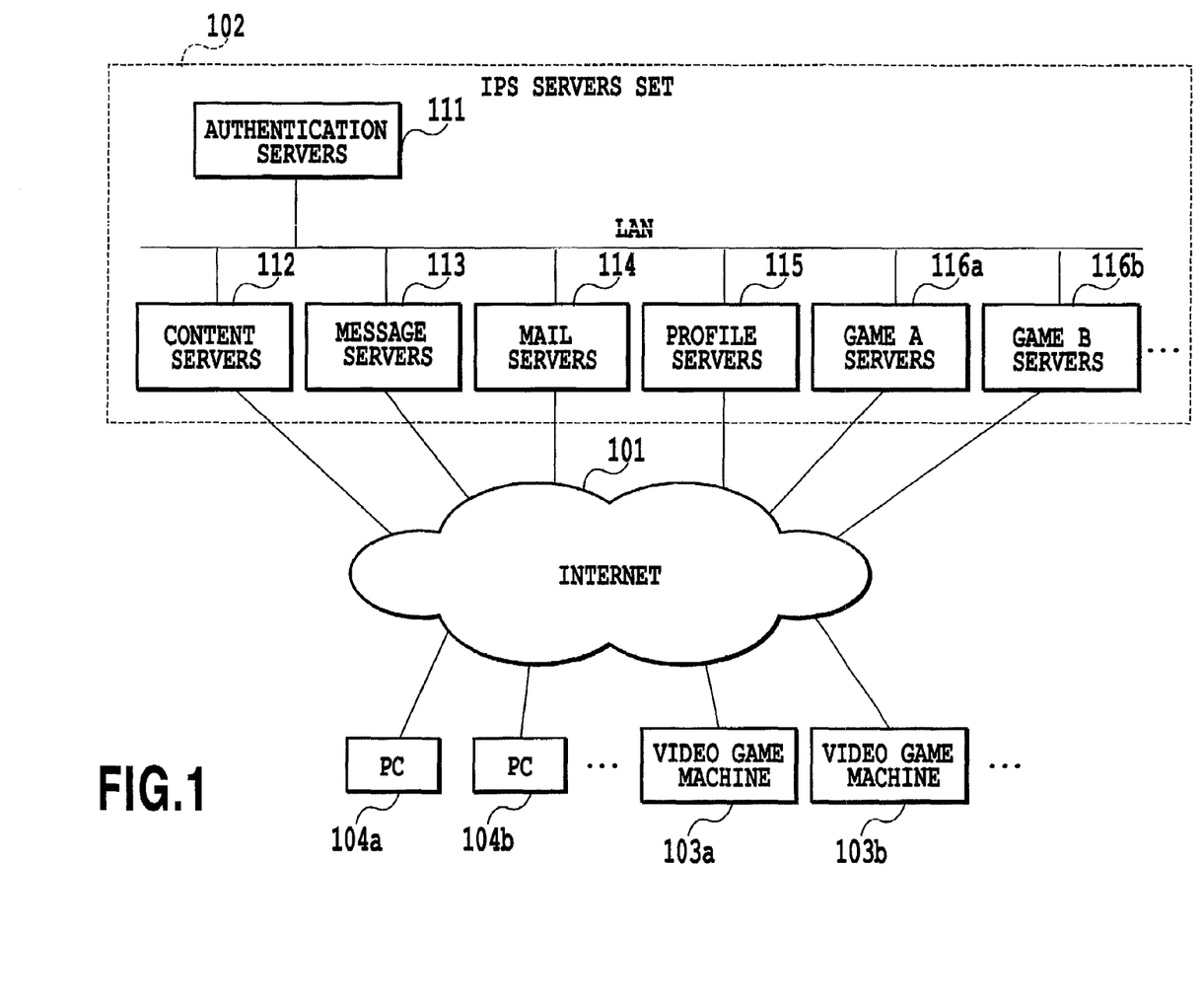
FIG. 1 is a schematic diagram that illustrates an example of a system configuration on which a method for message communications in accordance with a preferred embodiment of the present invention is applied.

FIG. 1 is an example a system configuration on which message communications in accordance with the present embodiment is applied. In this figure, the Internet 101 connects to a predetermined set of servers set 102 of an internet service provider (ISP) and also connects to video game machines 103a and 103b and general-purpose computers 104a and 104b. The ISP servers set 102 includes the following severs. That is, there are authentication servers 111 for administrating accounts of users to validate each user; content servers 112 for providing clients with a service for browsing various content such as voice, data, and motion pictures; message servers 113 for providing clients with the environments for allowing messages exchanges across the Internet using chat and messenger applications; mail servers 114 for providing clients with electronic mail service; profile servers 115 for managing user profiles; and amusement servers 116a, 116b for providing clients with the environments of online games. These servers in the ISP servers set 102 interact with each other through a communications line of a local area network (LAN).

Depending on such a configuration, the user is permitted to get his or her authentication by making access to the authentication servers 111. The server 102 sends a menu screen to the authenticated client. Then, the user makes a choice among several alternative services displayed on the menu screen, resulting in a connection to appropriate servers in response to the service being required by one of the video game machines 103a, 103b and the general-purpose computers 104a, 104b. Consequently, the user can be allowed to receive various kinds of information services.

Figure 2:
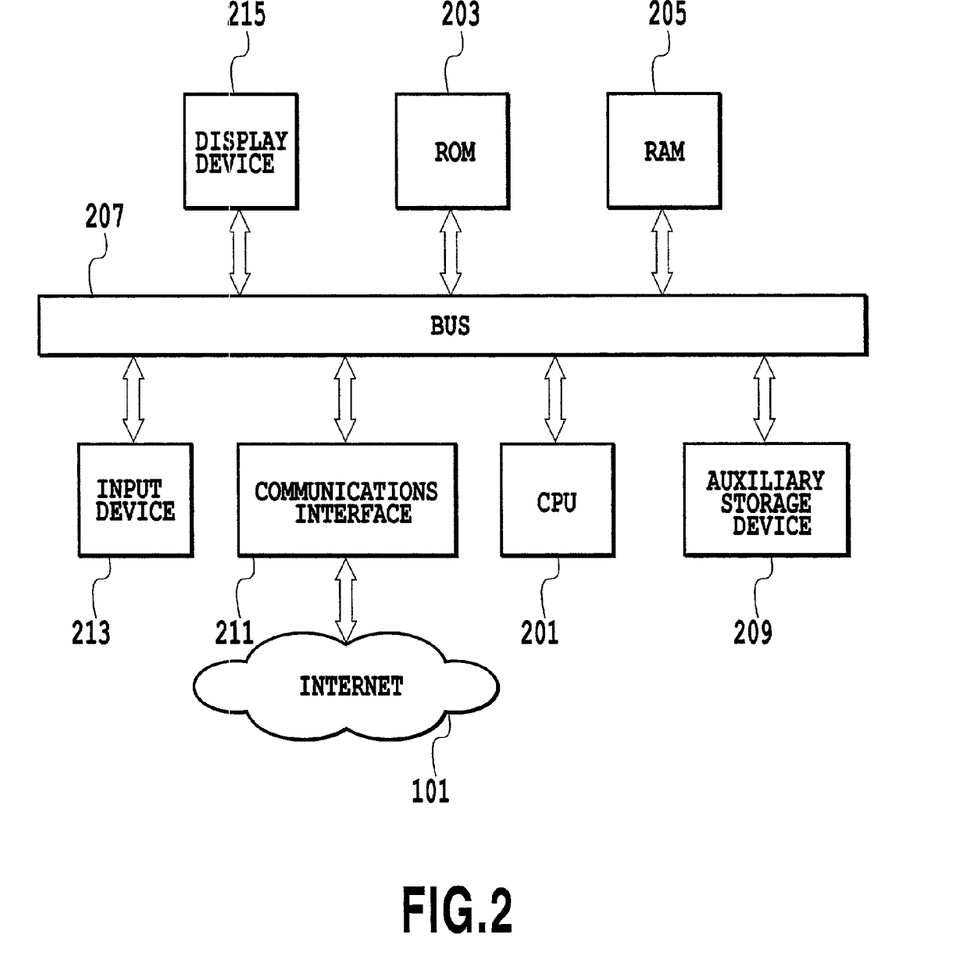
FIG. 2 is a block diagram that illustrates an example of a hardware configuration of a user terminal.

FIG. 2 illustrates an example of hardware configuration of the computer system to be used as the video game machine or the general-purpose computer (hereinafter, referred to as "a user terminal"). The user terminal includes a central processing unit (CPU) 201 and a random access memory (RAM) 205. Both the CPU 201 and the RAM 205 connect to an auxiliary storage device 209 and a read only memory (ROM) 203 through a bus 207. The auxiliary storage device 209 may be a hard disk drive, a CD-ROM drive, a digital video disk (DVD) drive, or the like. The auxiliary storage device 209 stores mail software as a program for message transmission and reception; a program for executing the procedure with respect to the present invention, such as a scheduler; data to be referenced by these programs; and so on.

A communications interface 211 is integrated in the bus 207, for example which is capable of using any card or modem adapted for Integrated Services Digital Network (ISDN) that allows a data communications connection to the Internet 101.

A display device 215 may be for example a liquid crystal display (LCD) or a cathode-ray tube (CRT). An input device 213 is provided for the input of characters and numbers, which may be a keyboard, a pointing device such as a mouse or a track ball, or the like. As shown in the figure, these components connect to one another through the bus 207.

Advantages of the present invention can be attained by executing the computer programs stored in the ROM 203. Therefore, the CPU 201 that performs any command from the computer programs may function as a sending unit, an extracting unit, a converting unit, a registration unit, a returning unit, and so on. The computer programs execute together with an operating system. For the operating system, it is preferable to use a system that supports a visual computer environment known as a graphical user interface (GUI) multiple window. According to the present invention, however, it is not limited to a specific operating system environment.

Figure 3:
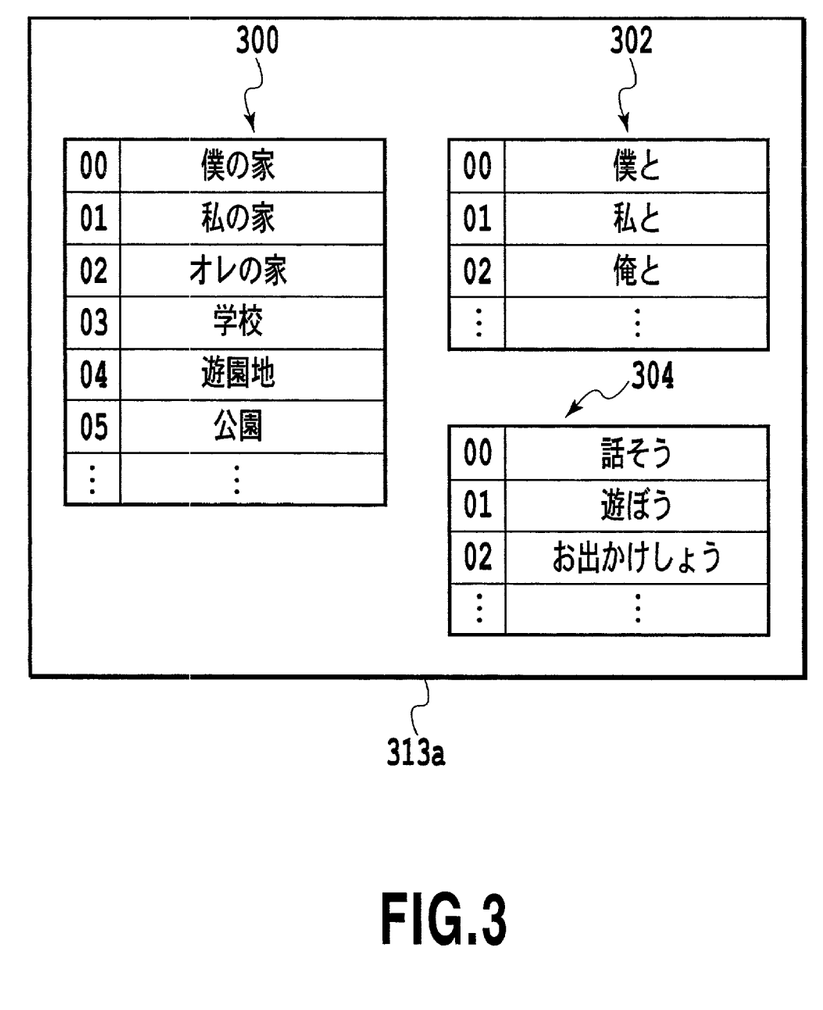
FIG. 3 is an example of data table stored in a storage device of the user terminal.

FIG. 3 is an example of a data table to be stored in the auxiliary storage 209 of the user terminal. In this example shown in FIG. 3, the data table 313a includes: a table 300 that represents a category of places (i.e., "Where"); a table that represents a category of doers (i.e., "Who"); and a table 304 that represents a category of actions (i.e., "How"). An identifier is assigned to each words and phrases in a category. In this embodiment, a numerical character is assigned as such an identifier.

Such a data table is mounted on the user terminal when the program of message transmission and reception is installed on the computer, so that both the sender terminal and the receiver terminal have their respective tables, where each table includes a group of data sets in which each set includes a pair of the word or phrase and its identifier. Regarding the data set being stored in the user terminal and the data set being stored in another user terminal, as described later, there may be cases where the same identifiers are assigned to different words or phrases having common, semantic contents.

Figure 4:
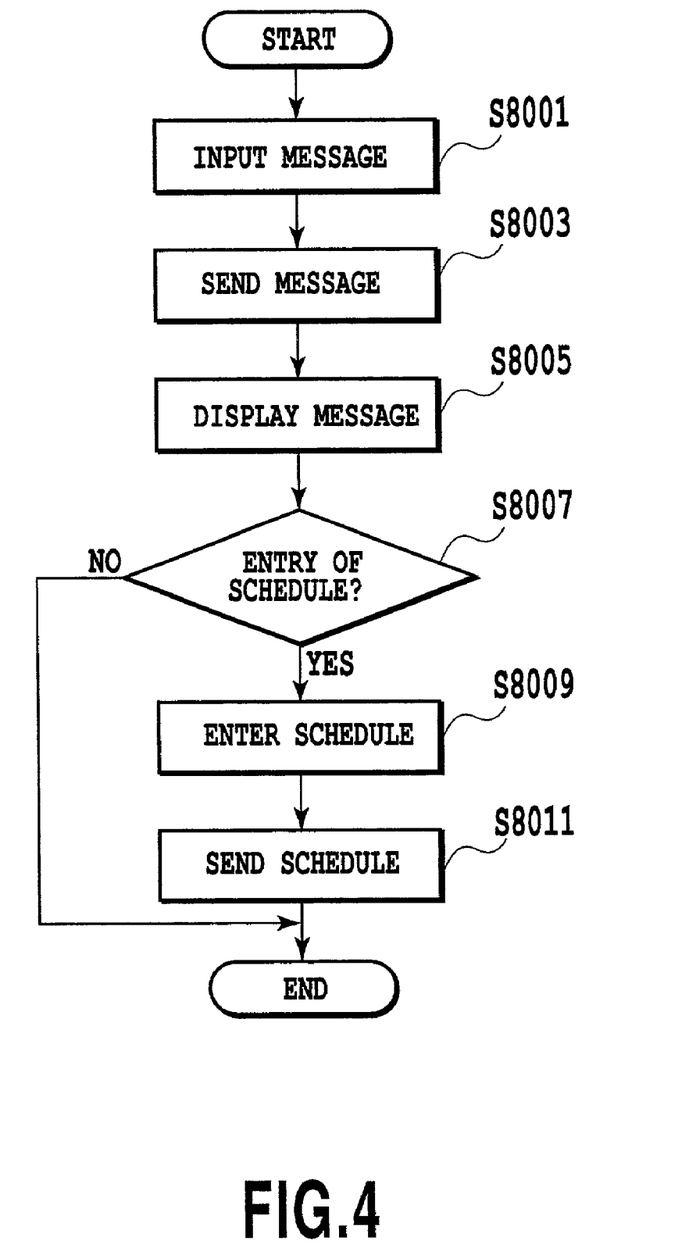
FIG. 4 is an example of flow chart that illustrates the process of entering a schedule using a scheduler in accordance with a preferred embodiment of the present invention.

FIG. 4 illustrates an example of process of entering a schedule using a scheduler in accordance with a preferred embodiment of the present invention. Accordingly, we will describe the process of message communications in accordance with the present embodiment with reference to an example in which a message is transmitted from a user of the video game machine 103a (hereinafter referred to as a user "A") to a user of the video game machine 103b (hereinafter referred to as a user "B").

According to the present invention, if the user wants to send a message, the user inputs to his video game machine, words or phrases in each category of "When", "How", and so on. At the input of words and phrases, the user selects one word or phrase from each menu of words and phrases provided in each category. The message consists of several words (hereinafter, referred to as "a set of words"). Each of the words that make up the message has its own identifier, so that a set of only the identifiers that corresponds to a set of the words is transmitted to another terminal. Thus, the receiver displays words corresponding to the received identifiers on a screen.

If the user A makes an inquiry about a schedule to the user B, the user A starts up a program of message transmission and reception (i.e., mail software) using the video game machine 103a. Then, the CPU 201 that executes such a program performs the extraction of words or phrases being stored in the data table 313a shown in FIG. 3 to make a list of extracted words or phrases. For the next step, the list is displayed on a screen of the display device 215 to permit the user B to select the words or phrases in the list (Step S8001).

Figure 5:
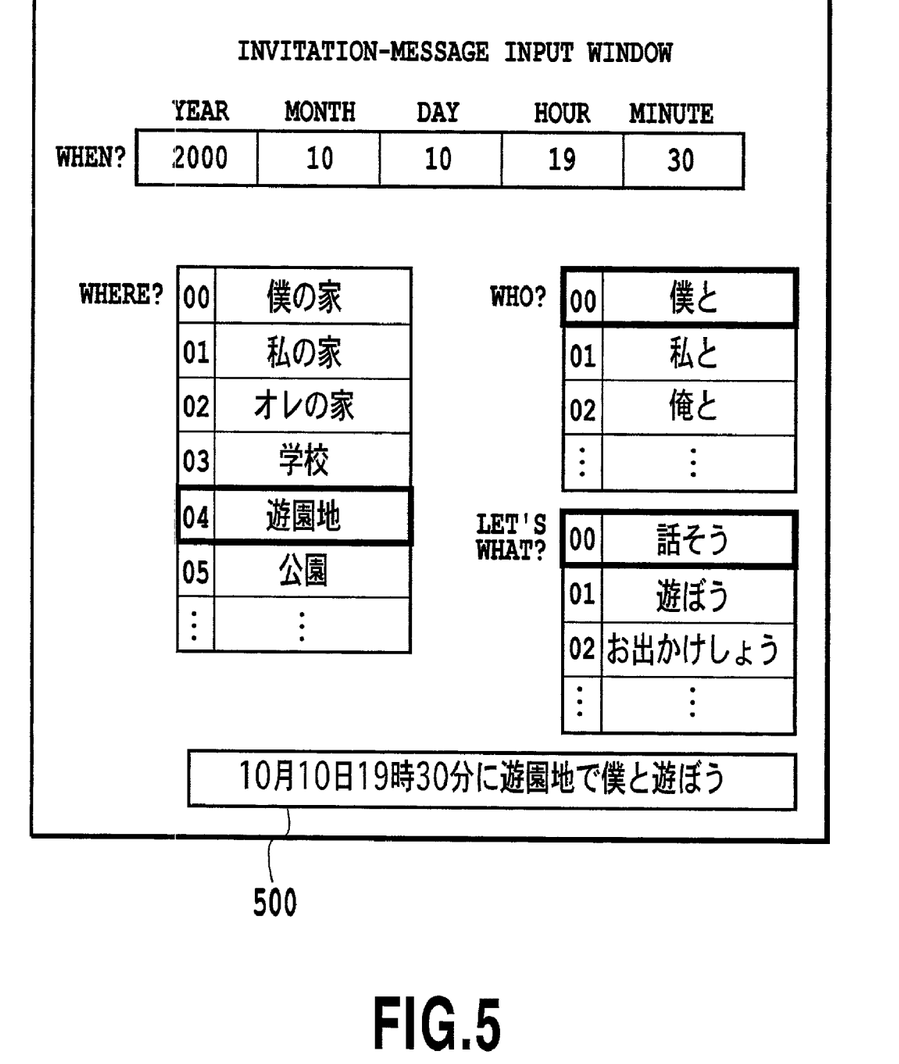
FIG. 5 is a schematic diagram that illustrates an example of a message-input menu on a screen to be displayed by a video game machine.

FIG. 5 illustrates an example of a message-input menu on a screen to be displayed by a display device of the video game machine 103a, on which the user selects appropriate words or phrases in the categories of "When", "Where", "Who", "What" to prepare a message 500 to be transmitted to the user B.

A set of identifiers that correspond to the selected words or phrases is extracted from the data table 313a in accordance with the message transmission and reception program. Then, the extracted identifier set is transmitted from the user A to the user B (Step S8003).

A method for transmitting the identifier set from the video game machine 103a is well known in the art. If an e-mail system is used in message transmission and reception, for example, the identifier set is received by the message server 113 and stored in a store-and-forward (S/F) device (not shown) therein. Subsequently, the message server 113 transmits information about the arrival of the message to the video game machine 103b. After the user B receives that information, the user B accesses the message server 113 and gets the identifier set from the S/F device by means of the mail software.

Figure 6:
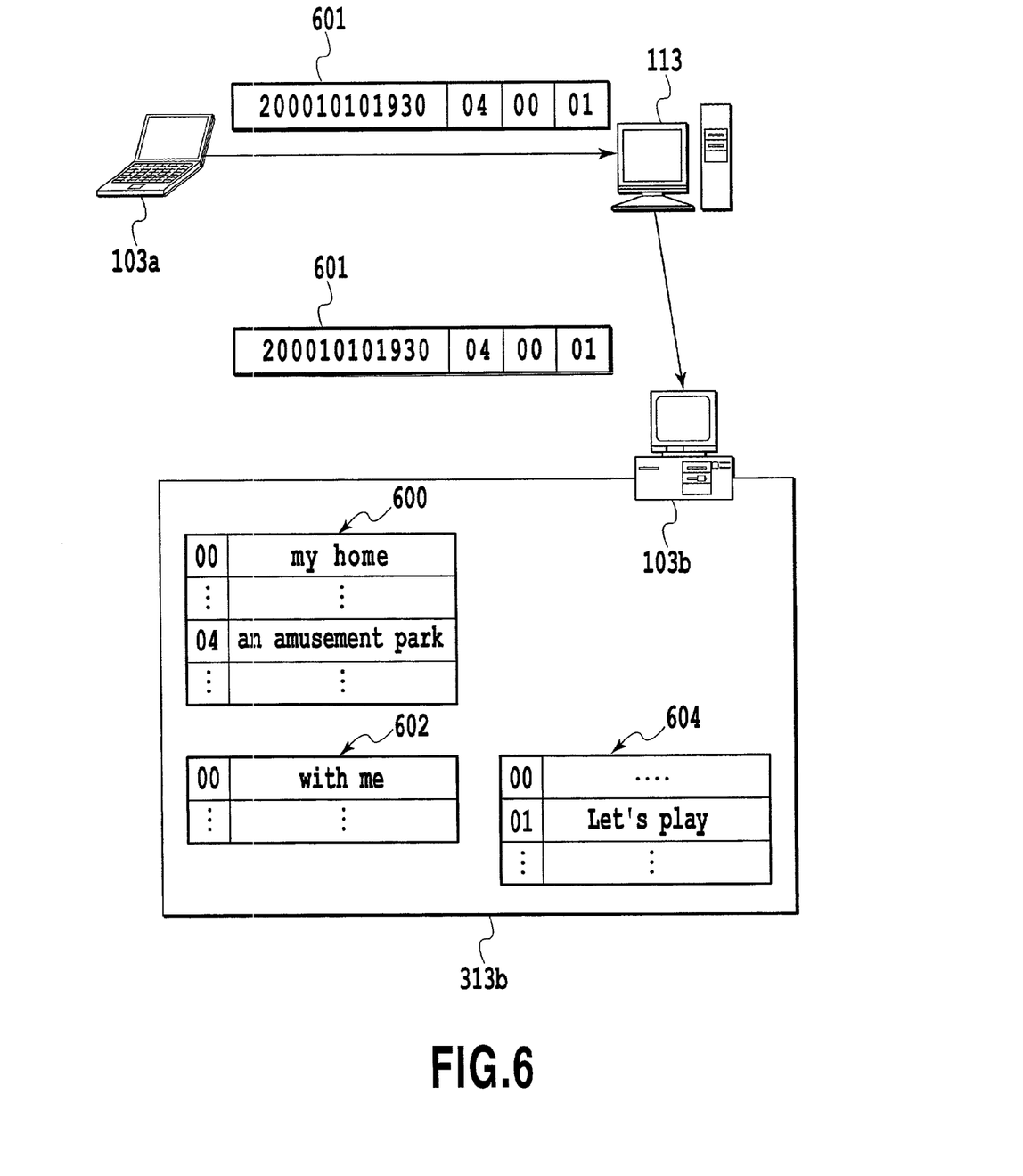
FIG. 6 is a schematic diagram that illustrates an example of process of transmitting a message from one computer to another computer.

Referring now to FIG. 6, an example of transmission process of the message will described. If the identifier set 601 sent from the video game machine 103a of the user A in Japan is a combination of "200010101930", "04", "00", and "01". By the way, this identifier set corresponds to the message 500 shown in FIG. 5. The identifier set shown in FIG. 6 is prepared on the basis of the data table 313a stored in the video game machine 103a of the user A, and also the identifiers in such a set correspond to respective words or phrases in the categories of "When", "Where", "Who", and "How".

On the other hand, the data table 313b stored in the video game machine 103b of the user B living in the U.S.A is different from the data table 313a of the video game machine 103a in Japan. In this case, however, the different tables 103a and 103b use common identifiers that represent common semantic contents of their corresponding words or phrases, respectively. That is, a table 600 that represents a category of location (i.e., "Where") among those in the data table 313b corresponds to the table 300 in the data table 313a. Similarly, a table 602 corresponds to the table 302 and also a table 604 corresponds to a table 304.

The video game machine 103b that received the identifier set 601 retrieves the data table 313b and extracts a desired set of words or phrases that respectively correspond to the identifiers in that set 601 in response to a command of the program for message transmission and reception. In the example shown in FIG. 5, the mail software of the video game machine 103b extracts phrases "my home", "with me", "Let's play" on the basis of the identifier set 601.

In this way, the sending of the identifier set allows the message transmission and reception between the transmitting end and the receiving end even if both ends utilize different languages. More concretely, for example, if there is an input of Japanese word "Kon-ni-chi-wa", its corresponding identifier "01" is transmitted to the receiving end. In this case, "Hello" is displayed on a screen of the receiving end if "Hello" is assigned to the identifier "01" in the receiving end's environment.

Figure 7:
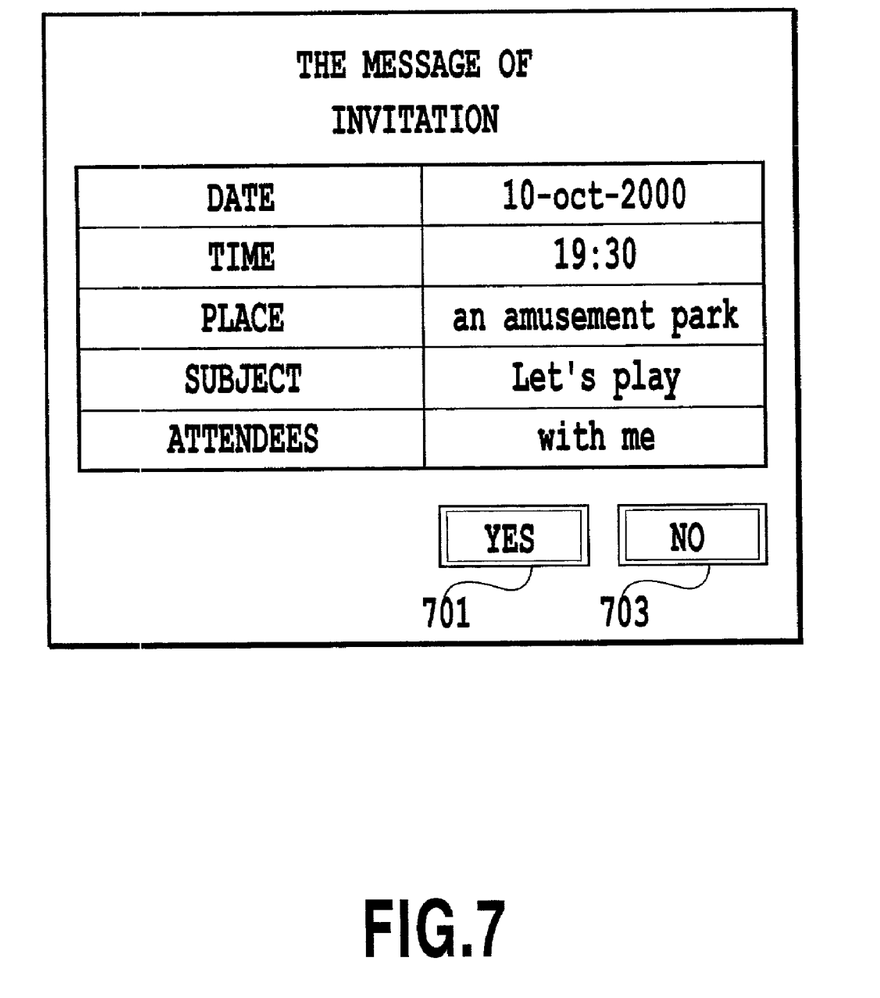
FIG. 7 is a schematic diagram that illustrates an example of an image on the screen to be displayed by the video game machine.

The display device 215 of the video game machine 103b displays a menu screen for the entry of the message as a schedule. Thus, the video game machine 103b accepts the selection between the "Yes" button 701 and the "No" button 703 displayed on the screen for determining whether the message should be accepted or not (Step S8007).

If the user B pushes down the "Yes" button using an input device 213 of the video game machine 103b, the process progresses to the step S8009 through the path marked by "Yes" from the Step S8007 in FIG. 4. As a result, a message including a set of the words or phrases represented on the screen is entered as a specific schedule in that machine 103b (Step S8009). The entry of the schedule may be performed by matching "Date" in the message with a word or a phrase of each of the categories of "Place", "Doer", "Action", and so on, and putting it in the storage device.

Subsequently, the video game machine 103b with the schedule being entered therein sends the identifier set to the profile server 115 through the communications interface 211 (Step S8011). The profile server 115 updates the schedule of both the user B and the user A entered therein in accordance with the identifier set received from the video game machine 103b. Furthermore, this set is transmitted from the profile server 115 to the video game machine 103a to rewrite the schedule in the video game machine 103a, resulting in coordination of schedules in each user terminal.

In the above description, we have described one of the preferred embodiments of the present invention. It is needless to say that the present invention is not limited to such an embodiment but also various kinds of other embodiments may be included in the present invention.

In the above embodiment, for example, every user terminal stores its own data table. It is also possible to organize a set of data tables as a single table such that the user terminal starts up the mail software and accesses the appropriate server to obtain a desired data table. Therefore, the message communications of the present invention can be applied in any case even though there are few resources available in the user terminal by organizing a set of the data tables as a single unit.

In the above embodiment, numerals are used as identifiers corresponding to words or phrases, respectively. Alternatively, characters or symbols may be used as such identifiers in accordance with the present invention.

Furthermore, the screen for accepting the entry of the schedule in the example shown in FIG. 7 adopts a form in which each of the key words or phrases (e.g., "When?", "With Who?", and "Do what?" is provided as one category of the messages and the categories with their respective items are independently listed as shown in the figure. According to the present invention, however, other forms may be used, for example key words or phrases may be combined together to provide them in the form of a sentence.

According to the present invention, one or more computer programs may be used on a computer system having a processor unit that is coupled to a recording device, an input device, and an output device so that the processor receives data and commands from these devices and also sends data and commands to them. These computer programs may be coded in a high-level programming language or an object-oriented programming language, or in assembly or machine language. Thus, the processor unit may receive the computer programs from those devices. Storage devices for substantially incorporating commands from any computer program to be used in the processor unit may include semiconductor storage devices such as EPROM, EEPROM, and flash storage devices, an internal hard disk, and removable recording media such as magnetic disks, CD-R (compact disc-recordable), and CD-R/E (compact disc-recordable and erasable).

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. An information processing apparatus capable of sending a message about a schedule to a second information processing apparatus through a communications network, wherein the second information processing apparatus is capable of analyzing the message being received and extracting words or phrases for entering into the schedule managed by a scheduler, the information processing apparatus comprising:

a first storage that stores a group of first data sets in which the words or phrases are matched to respective identifiers, while a second storage in the second information processing apparatus stores a group of second data sets corresponding to words or phrases having the same meanings as the words or phrases matching the respective identifiers of the first data sets;

a word or phrase selector that selects at least one word or phrase from the words or phrases stored in the first storage;

an extractor that extracts a specific identifier corresponding to the selected word or phrase from the first data sets;

a transmitter that transmits the extracted identifier as the message to the second information processing apparatus, wherein the identifier transmitted from the information processing apparatus is converted to a specific word or phrase on the basis of the second data sets stored in the second storage; and a receiver that receives a message from the second information processing apparatus when a user of the second information processing apparatus has affirmatively accepted the schedule corresponding to the transmitted message, wherein the words or phrases stored in the first storage are represented by a first natural language, while the words or phrases stored in the second storage are represented by a second natural language that is different from the first natural language, wherein the extracted identifier is stored in a server and sent to the second information processing apparatus in response to the second information processing apparatus receiving information about the message and accessing the server, and wherein scheduling is automatically performed, in response to an affirmative acceptance of a received message.

2. The information processing apparatus as claimed in claim 1, wherein the words or phrases of the first and the second storages are grouped into different categories and then stored in the first and the second storages, respectively.

3. An information processing apparatus capable of receiving a message about a schedule from a second information processing apparatus through a communications network, analyzing the message being received, and extracting words or phrases for entering into the schedule managed by a scheduler, the information processing apparatus comprising:

a first storage that stores a group of first data sets in which the words or phrases are matched to respective identifiers, while a second storage in the second information processing apparatus stores a group of second data sets corresponding to words or phrases having the same meanings as the words or phrases matching the respective identifiers of the first data sets;

a converter that converts the message in the form of the identifiers transmitted from the second information processing apparatus to the words or phrases on the basis of the first data sets stored in the first storage;

an entry system that enters the words or phrases converted by the converter into the schedule; and a returning system that returns a message received from the second information processing apparatus back to the second information processing apparatus when the words or phrases are entered into the scheduler by the entry system, the message return indicating whether a user of the first information processing apparatus has affirmatively accepted the schedule corresponding to the transmitted message;

wherein the words or phrases stored in the first storage are represented by a first natural language, while the words or phrases stored in the second storage are represented by a second natural language that is different from the first natural language, wherein the identifiers are received from a storage of a server in response to the information processing apparatus receiving information about the message and accessing the server, and wherein scheduling is automatically performed, in response to an affirmative acceptance of a received message.

4. The information processing apparatus as claimed in claim 3, wherein the words or phrases of the first and the second storages are grouped into different categories and then stored in the first and the second storages, respectively.

5. A method for message communications that allows an information processing apparatus to send a message about a schedule to a second information processing apparatus through a communications network, wherein the second information processing apparatus is capable of analyzing the message being received and extracting words or phrases for entering into the schedule managed by a scheduler, said method comprising:

storing a group of first data sets in a storage of the information processing apparatus, wherein the first data set matches the words or phrases to respective identifiers, while the second information processing apparatus stores a group of second data sets corresponding to words or phrases having the same meaning as the words or phrases matching the respective identifiers of the first data sets;

selecting at least one word or phrase from the words or phrases stored in the storage;

extracting a specific identifier corresponding to the selected word or phrase from the first data sets;

transmitting the extracted identifier as the message to the second information processing apparatus, wherein the identifier transmitted from the information processing apparatus is converted to a specific word or phrase on the basis of the second data sets; and receiving a message from the second information processing apparatus when a user of the second information processing apparatus has affirmatively accepted the schedule corresponding to the transmitted message;

wherein the words or phrases stored in the storage are represented by a first natural language, and the words or phrases stored in the second information processing apparatus are represented by a second natural language that is different from the first natural language, wherein the extracted identifier is stored in a server and sent to the second information processing apparatus in response to the second information processing apparatus receiving information about the message and accessing the server, and wherein scheduling is automatically performed, in response to an affirmative acceptance of a received message.

6. A method for message communications that allows an information processing apparatus to receive a message about a schedule from a second information processing apparatus through a communications network, wherein the second information processing apparatus is capable of analyzing the message being received, and extracting words or phrases for entering into the schedule managed by a scheduler, said method comprising:

storing a group of first data sets in a storage of the information processing apparatus, wherein the first data set matches the words or phrases to respective identifiers, while the second information processing apparatus stores a group of second data sets corresponding to words or phrases having the same meaning as the words or phrases matching the respective identifiers of the first data sets;

converting the message in the form of the identifiers transmitted from the second information processing apparatus to the words or phrases on the basis of the first data sets stored in the storage;

entering the converted words or phrases into the schedule; and returning a message received from the second information processing apparatus back to the second information processing apparatus when the words or phrases are entered into the scheduler, the message return indicating whether a user of the first information processing apparatus has affirmatively accepted the schedule corresponding to the transmitted message;

wherein the words or phrases stored in the storage are represented by a first natural language, and the words or phrases stored in the second information processing apparatus are represented by a second natural language that is different from the first natural language, wherein the identifiers are received from a storage of a server in response to the information processing apparatus receiving information about the message and accessing the server, and wherein scheduling is automatically performed, in response to an affirmative acceptance of a received message.

7. A recording medium on which a program is recorded, wherein the program enables a first information processing apparatus to send a message about a schedule to a second information processing apparatus through a communications network and the second information processing apparatus is capable of analyzing the message being received and extracting words or phrases for entering into the schedule managed by a scheduler, said program comprising:

storing a group of first data sets in a storage of the first information processing apparatus, wherein the first data set matches the words or phrases to respective identifiers, while the second information processing apparatus stores a group of second data sets corresponding to words or phrases having the same meaning as the words or phrases matching the respective identifiers of the first data sets;

selecting at least one word or phrase from the words or phrases stored in the storage;

extracting a specific identifier corresponding to the selected word or phrase from the first data sets;

transmitting the extracted identifier as the message to the second information processing apparatus; and receiving a message from the second information processing apparatus when a user of the second information processing apparatus has affirmatively accepted the schedule corresponding to the transmitted message;

wherein the words or phrases stored in the storage are represented by a first natural language, and the words or phrases stored in the second information processing apparatus are represented by a second natural language that is different from the first natural language, wherein the extracted identifier is stored in a server and sent to the second information processing apparatus in response to the second information processing apparatus receiving information about the message and accessing the server, and wherein scheduling is automatically performed, in response to an affirmative acceptance of a received message.

8. A recording medium on which a program is recorded, wherein the program enables a first information processing apparatus to receive a message about a schedule from a second information processing apparatus through a communications network and the second information processing apparatus is capable of analyzing the message being received, and extracting words or phrases for entering into the schedule managed by a scheduler, said program comprising:

storing a group of first data sets in a storage of the first information processing apparatus, wherein the first data set matches the words or phrases to respective identifiers, while the second information processing apparatus stores a group of second data sets corresponding to words or phrases having the same meaning as the words or phrases corresponding to the respective identifiers of the first data sets;

converting the message in the form of the identifiers transmitted from the second information processing apparatus to the words or phrases on the basis of the first data sets stored in the storage;

entering the converted words or phrases into the schedule, and returning a message received from the second information processing apparatus back to the second information processing apparatus when the words or phrases are entered into the scheduler, the message return indicating whether a user of the first information processing apparatus has affirmatively accepted the schedule corresponding to the transmitted message;

wherein the words or phrases stored in the storage are represented by a first natural language, and the words or phrases stored in the second information processing apparatus are represented by a second natural language that is different from the first natural language, wherein the identifiers are received from a storage of a server in response to the information processing apparatus receiving information about the message and accessing the server, and wherein scheduling is automatically performed, in response to an affirmative acceptance of a received message.

* * * * *